United States Patent [19]

Shimamoto et al.

[11] 4,372,558
[45] Feb. 8, 1983

[54] REMOTE GAME APPARATUS

[75] Inventors: Takeshi Shimamoto, Ashiya; Kazuo Arai, Neyagawa; Kazutsugu Kobayashi, Takatsuki, all of Japan

[73] Assignee: Matsushita Electric Industrial Co., Ltd., Osaka, Japan

[21] Appl. No.: 96,175

[22] Filed: Nov. 20, 1979

[30] Foreign Application Priority Data

Nov. 21, 1978 [JP] Japan .................. 53-144839
Nov. 22, 1978 [JP] Japan .................. 53-144821

[51] Int. Cl.³ ................ A63F 3/00; H04M 11/06
[52] U.S. Cl. ..................... 273/238; 273/237; 364/410; 179/2 DP
[58] Field of Search ............ 273/237, 238, 1 E, 1 ES, 273/271; 340/323; 364/410, 411; 179/2 DP

[56] References Cited

U.S. PATENT DOCUMENTS 3,654,392  4/1972  Beinhouker et al. .............. 273/237

FOREIGN PATENT DOCUMENTS 52-12049   1/1977  Japan .................. 273/237
52-37131   3/1977  Japan .................. 273/237
52-46951   4/1977  Japan .................. 273/237
54-4628    1/1979  Japan .................. 273/237
54-12934   1/1979  Japan .................. 273/237
54-108732  8/1979  Japan .................. 273/237
1488654   10/1977  United Kingdom ....... 273/237

Primary Examiner—Russell E. Adams
Attorney, Agent, or Firm—Wenderoth, Lind & Ponack

[57] ABSTRACT

A game apparatus for enabling players present at remote places from each other to easily play the game through a connected common communication network like a telephone line. The game apparatus has functions for detecting and displaying the moved arrangement of a game piece, for transmitting and receiving the detected signals via the communication network, and for collating the reproductive motion of one player, performed by watching the displayed moved arrangement of a game piece, with the intended motion carried out by the other player.

7 Claims, 8 Drawing Figures

REMOTE GAME APPARATUS

BACKGROUND OF THE INVENTION

This invention relates to a remote game apparatus for enabling players present at remote places from each other to easily play the game through a common communication network like a telephone line.

There exist various games such as chess, Go, and cards, which use a common game board and game pieces alternately moved by two oposite players present at the game board. In order to remove the limitation that the players must get together at the same place for playing these games, game systems have been proposed in which game apparatus placed remotely from each other are connected by common communication lines, and the movements of game pieces operated by the players are communicated to each other.

In such a game system, the information of the moved arrangement of a game piece communicated from one apparatus to another apparatus is displayed on the latter apparatus. By watching the display, the player of the latter apparatus reproduces the moved arrangement of a game piece and then considers a next motion and inputs the new movements of his game piece. This moved arrangement of a game piece is detected by the detecting means and then communicated. In such a manner the game advances.

While the reproduction of the movement of a game piece is performed by the player in the manner mentioned above, the movement of the reproduction of a game piece must not be mistaken. If the error of reproduction occurs by any chance, the arrangements of the game pieces of the apparatus placed at remote places are not in accord. Under such a condition, the game cannot be advanced. Accordingly, in the remote game system, the communication of only the information relating to the moved arrangement of game pieces sometimes causes such a situation that the advancement of the game becomes impossible due to an incorrect reproduction caused by a player.

SUMMARY OF THE INVENTION

The main object of this invention is to provide an apparatus which entirely shuts out such errors mentioned above by function of an added collating means which operates as follows. When a player reproduces a movement of a game piece on a game apparatus by watching the display on the apparatus, the coded data produced by the detecting means is collated with the coded data received by the communication means. The collating means, by displaying the result of the collation, then makes the player acknowledge the error of the reproduction when errors are caused. Accordingly, the player who makes an error certainly corrects the motion of the game pieces, and the game never suffers such a situation wherein the game cannot be advanced.

Another object of this invention is to let the player, who has made an intended motion of a game piece, know whether a correct reproduction is performed by the opponent player, by communicating the result of the collation of the apparatus of the opponent player and by displaying the result of the collation on the apparatus of the player who has made an intended motion of a game piece. Thus, the advancement the game becomes smooth, and moreover there occurs no errors of the arrangement of the game pieces on each apparatus.

A still further object of this invention is to omit the displaying element in the collating means as follows. When the motion of reproduction of the player is performed, the collating means collates the coded data produced by the detecting means with the coded data received by the communication means, and then only when the result is in accord is the display of the displaying means on the apparatus turned off. On the other hand, after the reproduction is performed, the result of the collation is communicated. In the apparatus receiving this result of the collation, when the result of the collation is in accord, the display of the displaying means is turned off. Therefore, since turning-off of the display represents the correct reproduction of movements of game pieces, the displaying elements in the collating means can be omitted.

A yet further object of this invention is to remove errors caused by the communication network in the manner as follows. When a player makes an intended motion of a game piece on his game apparatus, the communication means thereof transmits, to the opponent's apparatus, the coded data signal detected by the detecting means, and at the same time, it temporarily stores the coded data signal. Then, after receiving the coded data signal transmitted from the opponent's apparatus by performing the reproduction of the player thereof, the collating means collates the received coded data with the coded date stored in the communication means.

If the result of the collation is in accord, the communication means transmits the coded data signal which signifies an accordance. Otherwise, the communication means again transmits the coded data signal stored therein. If errors occur in the communication network, the result of collation is not in accord, so that the correct coded data signal is again transmitted, and the error caused by the communication network is therefore corrected.

BRIEF DESCRIPTION OF THE DRAWINGS

This is invention will be more fully understood from the following detailed description taken in conjunction with the accompanying drawings, in which.

DESCRIPTION OF PREFERRED EMBODIMENTS

Figure 1:
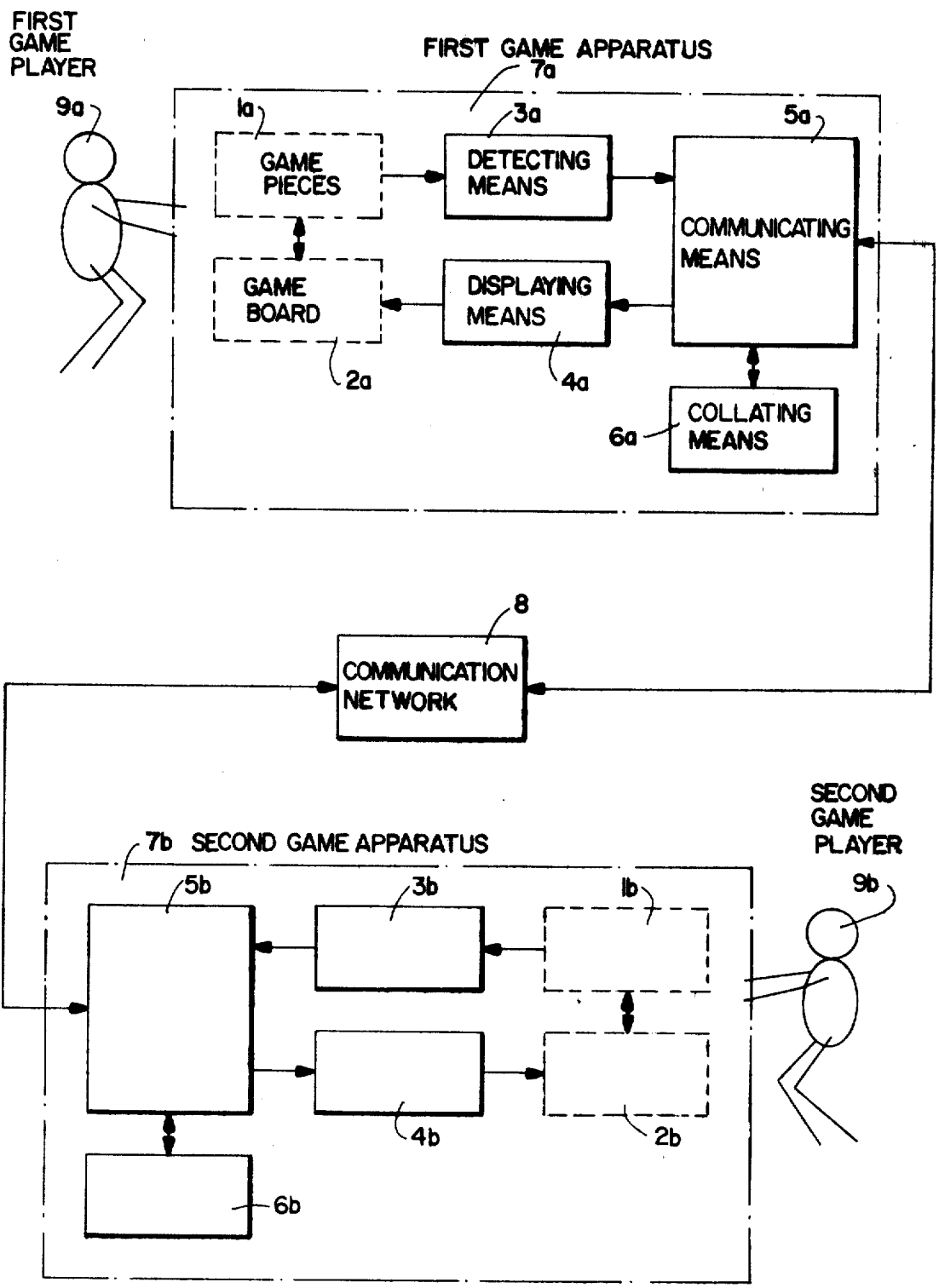
FIG. 1 is a block diagram of remote game system using the remote game apparatus according to the present invention.

A block diagram of a remote game system or apparatus is illustrated in FIG. 1. A first remote game apparatus 7a and a second remote game apparatus 7b have the same construction and are connected to a first end and a second end of a common communication network 8, respectively. The apparatus are operated by a first game player 9a and a second game player 9b, respectively.

Communication means 5a, 5b are for communicating each other via a network 8 between the apparatus 7a and the apparatus 7b. Collating means 6a, 6b are for collating the received coded data with the coded data produced by the detecting means 3a, 3b by reproductive movements of game pieces 1a, 1b on the game board 2a, 2b. Displaying means 4a, 4b are for displaying the received coded data on the game board 2a, 2b as an intended motion of the opponent player.

In one situation of the game process, each means operates as follows. The game advances by making one motion of the game pieces 1 alternately by the players of the respective apparatus according to the rule of the game. The apparatus of the player who is to make an intended motion of a game piece to the opponent player is to be called the transmitting side, and the other apparatus is to be called the receiving side.

In FIG. 1, in the beginning, a first game apparatus 7a is assumed to be the transmitting side and a second game apparatus is the receiving side. A first game player 9a looks at the arrangement of the game pieces 1a on the game board 2a considering a next motion and inputs the new movement of his game piece to detecting means 3a. The detecting means 3a detects the moved arrangement of a game piece and provides a coded data signal which corresponds to the coordinates of the moved arrangement for the communication means 5a. The communication means 5a transmits this coded data signal to the receiving side through the communication network 8. In the receiving side, the apparatus 7b receives the coded data signal by the communication means 5b and by the received coded data, the display means 4b displays a new arrangement of a game piece moved by the first game player 9a on the game board 2b.

The player 9b of the receiving side reproduces the movement of a game piece 1b on the game board 2b by watching this display as an intended motion of the transmitting side player 9a. The detecting means detects this movement of a game piece 1b and produces coded data. The collating means 6a collates this coded data with the coded data received by the communication means previously, and the result of collation is displayed by this collating means 6a.

The receiving side player 9b can examine whether his reproduction is correct or not. Correct reproduction of a game piece as an opponent player's motion is the most important matter in the remote game system. If a reproduction error occurs, the game advancement becomes confused and thus becomes impossible. After the correct reproduction of the player 9b of the receiving side apparatus 7b is performed, the apparatus 7b of the player 9b, who can now input, becomes the transmitting side. Repeating these sequences, the players can advance the game play.

Figure 2:
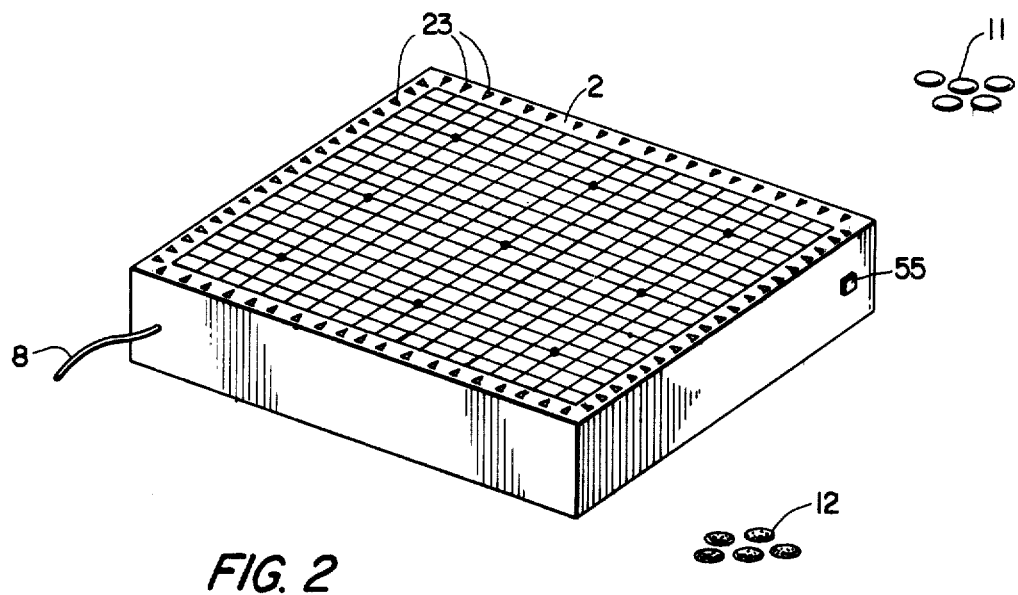
FIG. 2 is a pictorial view of a "Go" playing console example according to the present invention.

A "Go" console 2 for playing a Go game, as an example of a remote game apparatus, is illustrated in FIG. 2. A Go game is played between two players. It is played with white stones 11 and black stones 12 on a 19 by 19 lined board. There are 361 intersection points on the grid. The players alternately place each stone belonging to them respectively in turn on any vacant intersection point. In the course of the play, an opponent player's stones may be captured when surrounded by the stones of the other player. Accordingly, in the Go game, by assigning coordinates to intersection points on the grid, the Go game can be played by two players present at remote places from each other, by alternately communicating, through the communication line 8, the coordinates on which stones have been placed or removed.

Figure 3:
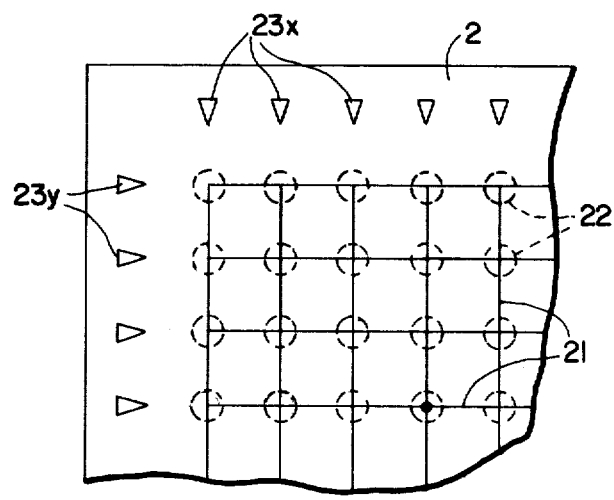
FIG. 3 is a partial view of the console surface of FIG. 2.

The upper surface of the Go console 2 is used as a Go board, and a plan view of the part thereof is illustrated in FIG. 3. In FIG. 3, switches are arranged under individual intersection points 22 of lines 21 and can be closed by the stone pressure pushed by the player. (These switches are identical to the switches 31 in FIG. 4). Lamps 23 for displaying coordinates are arranged at the circumference of the grid. The lamps 23x, 23y are respectively used for displaying X, Y coordinates. Accordingly, there are 76 lamps totally, and 4 lamps are selectively lit for displaying the position on which one stone has been placed or removed by the opponent player.

Figure 4:
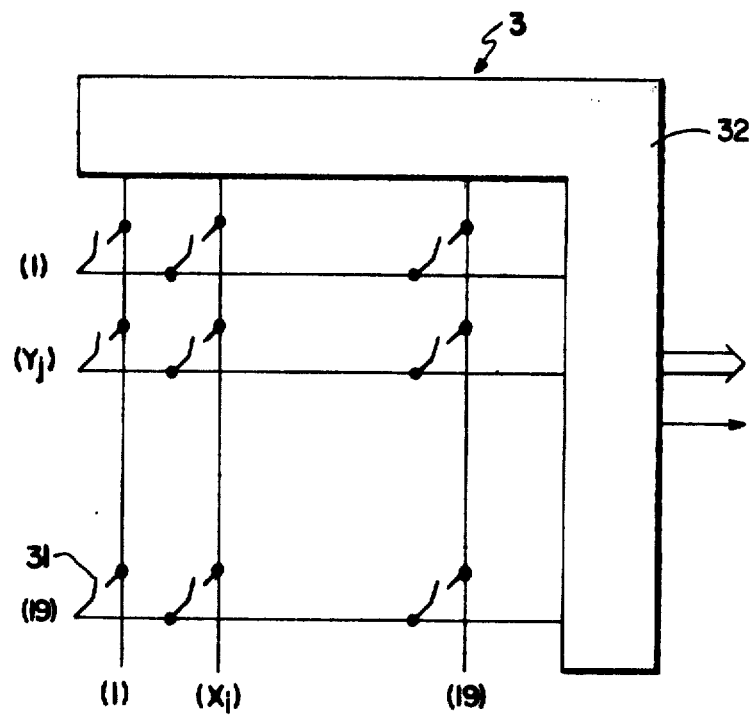
FIG. 4 is an example of the detecting means.

A detecting means is illustrated in FIG. 4. The switch elements 31, which are arranged under the intersections of Go console and which operate by sensing pressure, are wired in a 19 by 19 matrix and connected to an encoder circuit 32 which produces a 10-bit binary coded signal corresponding to the coordinate where one of the switch elements 31 is pressed. At the same time, additionally, the encoder circuit produces a gating signal which enables the loading of said 10-bit binary coded signal into a shift register.

Figure 5:
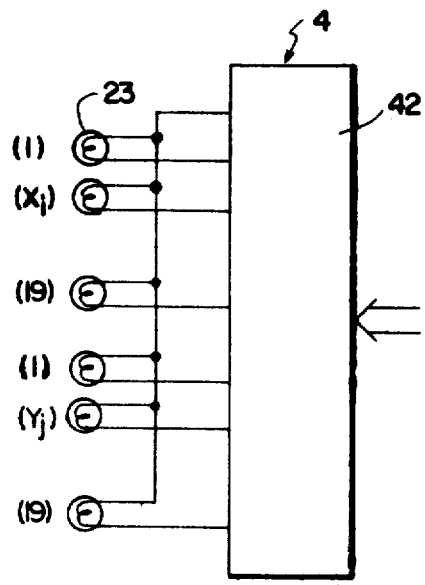
FIG. 5 is an example of the displaying means.

A displaying means is illustrated in FIG. 5. In FIG. 5, a decoder circuit 42 decodes the coded data received by the communication means 5 in FIG. 1, and drives the lamps 23 to display a position on which one stone has been placed or removed by the opponent player.

Figure 6:
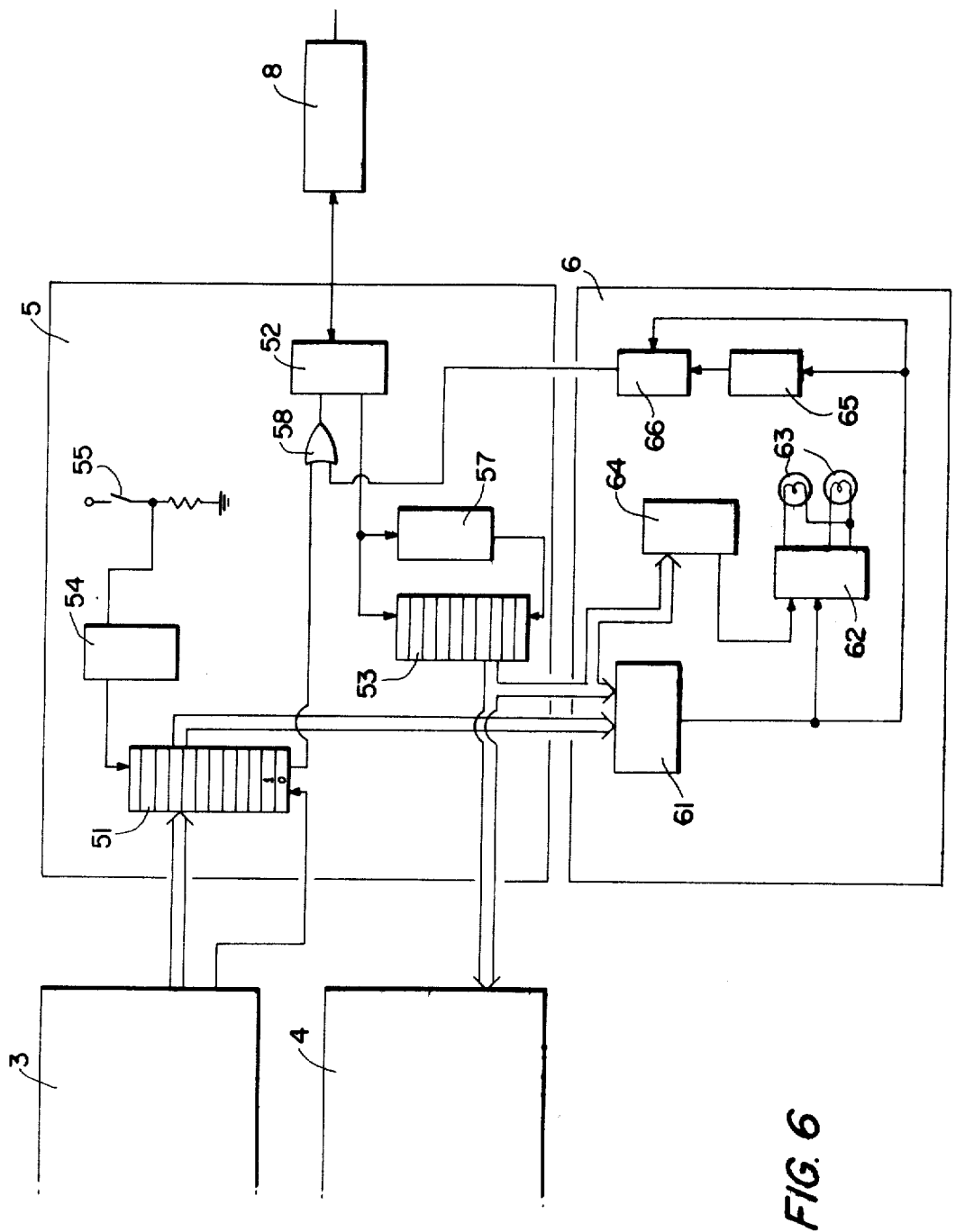
FIG. 6 is an electronic circuit block diagram of the "Go" console in FIG. 2.

An electronic circuit block diagram of Go console in FIG. 2 is illustrated in FIG. 6. When a first game player 9a inputs his new motion of a stone on the Go board and presses the stone, the encoder circuit 32 produces a 10-bit binary coded data signal, as mentioned above with respect to the description of the detecting means. This 10-bit binary coded signal is stored into a 12-bit parallel in/serial output shift register 51 by the gating signal which is also an output of the encoder circuit 32. The residual 2 bits for the shift register 51 are bits which are used for the well-known start-stop synchronization scheme. A start element "1" signal and a stop element "0" signal are normally provided for the residual 2 bits.

When the transmitting switch 55 (which is also illustrated in FIG. 2) is closed by the player 9a, a clock generator 54 produces a serial 12-bit pulse train, and by this 12-bit pulse train, the shift register 51 produces a 12-bit binary coded serial data signal including "0" and "1" bits on the start thereof according to the coordinates of the moved piece. This 12-bit binary coded serial data word is applied to a modem 52 through an OR gate 58 and then modulated into a communicable data format, and communicated by the modem 52 via a communication network 8 to the opponent player's console.

On the other hand, in the opponent player's console, the modem 52 receives this transmitted signal and demodulates it to produce a 10-bit binary coded serial data signal. At the same time, a timing pulse generator 57 provides write pulses, which are generated by referring to the start element "0" and "1" of the synchronous signal. The 10-bit binary coded serial data word is applied to the serial input terminal of a shift register 53, and the write pulse is applied to the write clock terminal of the shift register 53. Accordingly, in the shift register 53 are loaded the (X, Y) coordinates, corresponding to the 10-bit data word, on which one stone has been placed or from which one stone has been removed by the opponent player. The 10-bit parallel (X, Y) coordinates signal, output from the shift register 53, is applied to the decoder circuit 42, and 4 lamps are selectively lit for displaying the received coordinates. The receiving side player reproduces the motion of a game piece, by watching the display, putting a stone of the opponent's color when the appointed place is vacant, or removing a stone when the appointed place is not vacant.

In this occasion, by pressing the top of the corresponding stone, a coded data signal is produced by the detecting means 3 like the input motion, and is then stored in the shift register 51. A comparator 61 compares the coded data stored in the shift register 51 with the received and stored coded data in the shift register 53, and produces an output corresponding to the result of the comparison. By this output of the comparator 61, the display circuit 62 of the collating means 6 displays the result of the comparison by turning on the lamps 63 selectively with the expression of "accord" or "discord".

In a Go game, since there are 361 points where a player can input, reproduction errors are likely to occur. But, by the function of the collating means 6, reproduction errors are immediately displayed. Accordingly, such reproduction errors are immediately corrected by a player, and it is possible to deprive the game of the reproduction errors entirely. Additionally, by using a buzzer instead of lamps 63, in the case of reproduction error, it is more certain to make the player notice his error by ringing this buzzer.

Further operation is included in the circuit of FIG. 6, that is as follows. By the output of the comparator 61, a clock generator 65 produces a pulse train. From this pulse train and the output of the comparator 61, a code generator 66 generates a serial coded data signal corresponding to an accordance or discordance according to the respective outputs of the comparator 61. These coded data signals are not equal to any coded data corresponding to the coordinates. The serial coded data produced by the code generator 66 is applied to the modem 52 through the OR gate 58 and then transmitted in a fashion similar to the coded data signal corresponding to the coordinates.

On the other hand, the console which receives this serial coded data stores this serial coded data into the shift register in a fashion similar to the coded data signal corresponding to the coordinates. The stored data is then detected by a verification circuit 64. When the verification circuit 64 detects the coded data corresponding to an accordance or a discordance, the display circuit 62 displays such an accordance or discordance by selectively turning on one of the lamps 63. Accordingly, the result of the reproduction of the opponent's move can be seen by a player who has made an intended motion of a game piece.

For the players remotely placed from each other, the matter of whether the opponent player reproduces the first players motion correctly or not is the most important point. But the display of the result of the collation of the transmitting side console enables the players to play the game without anxiety. In the transmitting side console, if the received coded data signal is not in accord, a new effect is achieved by adding a register for the shift register 51, so as to make it possible to again transmit the coded data signal corresponding to the coordinates.

Figure 7:
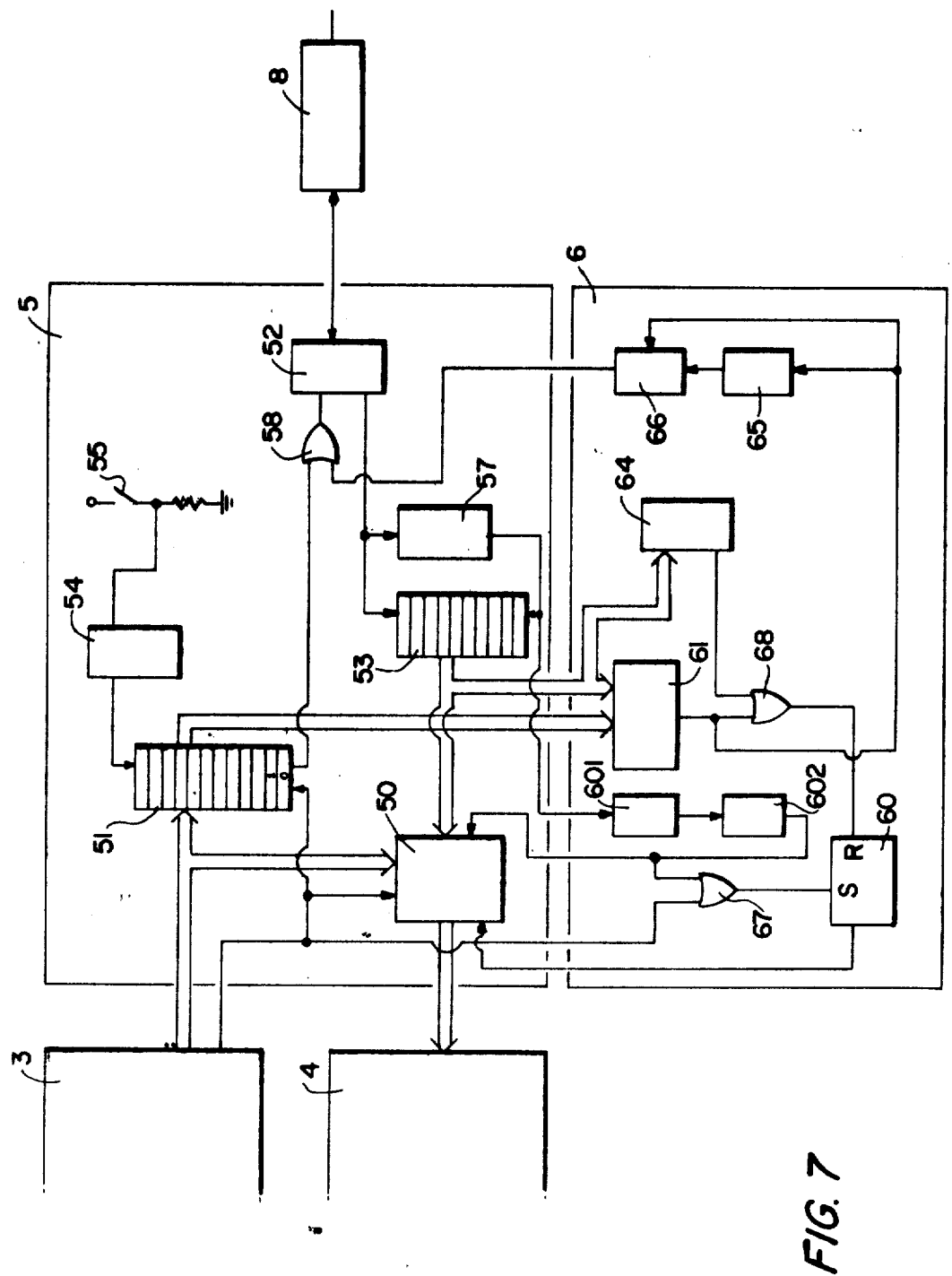
FIG. 7 is another electronic circuit block diagram of the Go console in FIG. 2.

Another electronic circuit block diagram of a Go console is illustrated in FIG. 7. In FIG. 7, when compared with FIG. 6, a flip flop 60 and a data selector register 50 are added, and the display circuit 62 and the lamps 63 are omitted. The operation is as follows.

In the transmitting side console, the coded data signal, produced when a player inputs his intended motion of a game piece, is stored in the data selector register 50 in a fashion similar to the shift register 51. At the same time, the flip flop 60 is set to a set state by the gating signal through an OR gate 67; the gating signal is an output of the detecting means. When the flip flop 60 is in a set state, a data selector register 50 outputs the stored coded data. Therefore, 4 lamps on the game board are turned on so as to correspond to the coordinate where the player has input his motion. When the communication means receives the serial coded data signal corresponding to an accordance, the verification circuit 64 detects this coded data and produces a signal to reset the flip flop 60 to its reset state through an OR gate 68. Consequently, the data selector register 50 does not output a coded data signal corresponding to a coordinate, and the 4 lamps on the game board are turned off. In summation, when the correct reproduction of the opponent player is performed, the display of the lamps is turned off, and the player of the transmitting side can recognize that the correct reproduction has been performed.

On the other hand, in the receiving side console, a received coded data signal corresponding to a coordinate is stored in the shift register 53 as mentioned before. At the same time, the pulses produced by the timing pulse generator 57 are counted by a binary counter 601, and when 10 pulses are counted, the pulse generator 602 produces a single pulse. By this single pulse, the data selector register 50 stores the received coded data signal corresponding to a coordinate from the shift register 53, and at the same time the flip flop 60 is set to its set state through the OR gate 67. Since the flip flop 60 is in its set state, the data selector register outputs the stored coded data signal corresponding to a coordinate where the transmitting side player has input his intended motion, and the 4 lamps corresponding to that point are turned on.

When the receiving side player reproduces a motion of a game piece, and the result of the collation is in accord, the flip flop 60 is reset by the output of the comparator 61 to its reset state, and the displayed lamps are turned off. It goes without saying that the result of the collation is transmitted by the function of the clock generator 65, the code generator 66 and the modem 52. When the output of the comparator 61 is not in accordance, the flip flop 60 is not reset to its reset state, so that the display of the lamps is not turned off. Consequently, the receiving side player can recognize whether his reproductive motion is correct or not, by watching the state of the display lamps.

As mentioned above, by adapting the electronic circuit of FIG. 7 to the Go console, the displaying circuit 62 and displaying lamps 63 can be omitted without any lack of the function of the collation.

Furthermore, there exist other operations in the remote game system of FIG. 1, that are explained below.

In the beginning, the apparatus 7a is assumed to be the transmitting side, and the apparatus 7b is assumed to be the receiving side. When a player 9a produces an intended motion of a game piece 1a, the detecting means 3a detects the motion of a game piece 1a. The coded data signal of the motion of a game piece is then transmitted and temporarily stored by the communication means 5a. In the receiving side apparatus 7b, this coded data signal is received by the communication means 5b, and displayed in the apparatus 7b by the displaying means in the same manner as that before-mentioned. When the receiving side player 9b performs the reproduction of the motion of a game piece, the coded data signal produced by the detecting means 3b is transmitted to the transmitting side apparatus 7a through the communication network.

In the transmitting side apparatus 7a, the communicating means 5a receives the transmitted coded data signal. The collating means 6a then collates the received coded data signal with the stored coded data in the communication means 5a, and displays the result of the collation. Consequently, the transmitting side player can examine whether the opponent player performs a correct reproduction or not. In the way of collation, since the collating action is done in the transmitting side apparatus, the transmitting side player can recognize the errors caused not only by the opponent player but in the communication network. In other words, if the player 9b performs a correct reproduction of a game piece by the display but the coded data signal transmitted through the communication network is distorted or changed by noise, the collating means 6a produces the collating result corresponding to a discordance and displays "discord". By again transmitting a coded data signal previously stored in the communication means 5a, the receiving side player can recognize the fact that errors have been caused somewhere, and can correct the reproduction.

Accordingly, the discordant state of the arrangement of game pieces between the remotely located apparatus is entirely removed from the game advancement.

Figure 8:
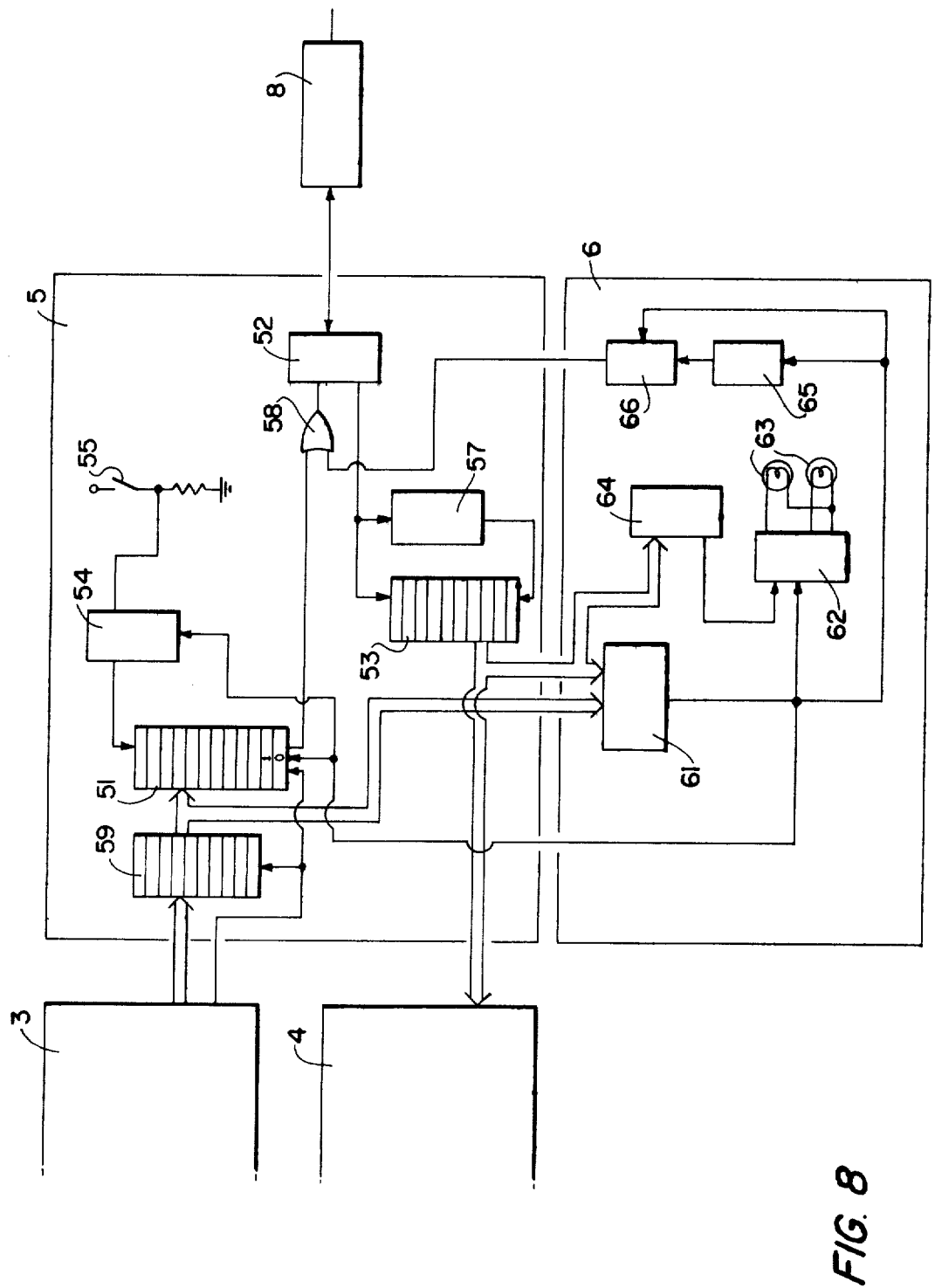
FIG. 8 is still another electronic circuit block diagram of the Go console in FIG. 2.

In FIG. 8, an electronic circuit block diagram of Go console in FIG. 2, which operates similarly to the above mentioned manner, is illustrated. In FIG. 8, all elements except a register 59 are identical to the same numbered elements of FIG. 6. When a first game player 9a inputs his new motion of a stone on the Go board and presses the top of the stone, a 10-bit binary coded data signal is produced by the detecting means as mentioned before. This produced 10-bit binary coded signal is stored into a 10-bit parallel-in-parallel-out shift register 59 and a 12-bit parallel-in-serial-out shift register 51, at the same time, by the gating signal produced by the detecting means. When the transmit switch 55 is then closed, the 10-bit coded data signal is transmitted to the opponent's console in a fashion similar to the electronic circuit of FIG. 6.

On the other hand, in the receiving side console, the 10-bit binary coded data signal is received, and the corresponding coordinates are displayed in a fashion similar to the electronic circuit of FIG. 6. The receiving side player reproduces the motion of a game piece, by watching the display, and by pressing the top of the corresponding stone, a coded data signal is produced by the detecting means 3 and stored into the shift register 51 of the receiving side console. When the transmit switch 55 is closed, in the next place, the coded data signal corresponding to the reproduction is transmitted to the transmitting side console in the same manner as the transmitting operation in the transmitting side console.

In the transmitting side console, this coded data signal is received and stored in the shift register 53 in the same manner as the receiving operation in the receiving side console. The comparator 61 collates this stored data in the shift register 53 with the stored coded data in the shift register 59 corresponding to the intended motion of the transmitting side player. The display circuit 62 displays the result of the collation by selectively turning on one of the lamps 63. Consequently, the transmitting side player can recognize whether the coded data signal is transmitted without errors, and the opponent player reproduces a correct motion of a game piece. Accordingly the entire communications loop, including the players and the communication network, can be checked and the arrangement of game pieces on the remotely located game board can be entirely identical to each other.

Additionally, by the functions of the clock generator 65 and the code generator 66, it is possible to transmit a serial coded data corresponding to the result of the collation so as to inform the receiving side player of the result of the collation, in the same manner as that of the electronic circuit of FIG. 6. When the result of collation is discordant, by the resultant signal of comparator 61, the stored coded data in the shift register 59 is transferred to the shift register 51, and the clock generator 54 is activated. Consequently, the stored coded data in the shift register 59 corresponding to the intended motion of the transmitting side player is again applied to the modem, and is again transmitted to the opponent player's console. Thus, on the occasion of errors, it is possible to transmit the coded data corresponding to the coordinates where the transmitting side player has produced a motion as his intended motion.

Although specific examples have been described above, it is apparent to those of ordinary skill in the art that various modification may be made without departing from the substantial properties of this invention. The above described specific examples are intended merely to illustrate the various facets in certain selective embodiments of this invention, the scope of which it is intended shall be limited only by following claims.

What is claimed is:

1. A remote game apparatus that enables players present at remote places to play a game by communicating via a common communication network, comprising:
    detecting means for detecting a moved arrangement of a game piece on a game board and for providing a coded data signal;
    communication means for communicating said coded data signal between two identical apparatus via said communication network;
    displaying means for displaying a moved arrangement of a game piece in response to said received coded data signal; and
    collating means for collating the coded data signal, supplied from the detecting means by a reproductive action of a game player performed by watching the display of said displaying means, with the coded data signal received by said communication means, and for displaying the result of the collation.

2. A remote game apparatus according to claim 1, wherein said communication means additionally transmits said result of said collation of said collating means from one apparatus to the other apparatus via said communication network.

3. A remote game apparatus according to claim 1, wherein said displaying means turns off the display when said result of said collation of said collating means is in accord.

4. A remote game apparatus according to claim 2, wherein said displaying means turns off the display when said result of said collation received by said communication means is in accord.

5. A remote game apparatus that enables players present at remote places to play a game by communicating via a common communication network, comprising:
   detecting means for detecting a moved arrangement of a game piece on a game board and for providing a coded data signal;
   communication means for transmitting and receiving said coded data signal between two identical apparatus via said communication network, and for storing temporarily said coded data signal when transmitting;
   displaying means for displaying a moved arrangement of a game piece in response to said received coded data signal; and
   collating means for collating said coded data signal stored in said communication means with the received coded data signal which is transmitted by the communication means from one apparatus to the other apparatus after being provided by said detecting means, when the player of said other apparatus performs a reproductive motion of a game piece on a game board by watching the display on the apparatus, and for displaying the result of the collation.

6. A remote game apparatus according to claim 5, wherein said communication means again transmits said stored coded data signal when said result of said collation of said collating means is not in accord.

7. A remote game apparatus according to claim 5, wherein said communication means additionally transmits said result of said collation of said collating means from one apparatus to the other apparatus via said communication network.

* * * * *